US012110130B2

(12) United States Patent
Jha et al.

(10) Patent No.: US 12,110,130 B2
(45) Date of Patent: Oct. 8, 2024

(54) MULTI MODE AIRCRAFT BEACON LIGHT AND AIRCRAFT COMPRISING A MULTI MODE AIRCRAFT BEACON LIGHT

(71) Applicant: Goodrich Lighting Systems GmbH & Co. KG, Lippstadt (DE)

(72) Inventors: Anil Kumar Jha, Lippstadt (DE); Andre Hessling von Heimendahl, Koblenz (DE); Jens Leuschner, Möhnesee (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/404,579

(22) Filed: Jan. 4, 2024

(65) Prior Publication Data

US 2024/0228059 A1      Jul. 11, 2024

(30) Foreign Application Priority Data

Jan. 10, 2023   (EP) .................................... 23151033

(51) Int. Cl.
*B64D 47/06*   (2006.01)
*F21S 43/10*   (2018.01)
(Continued)

(52) U.S. Cl.
CPC .............. *B64D 47/06* (2013.01); *F21S 43/10* (2018.01); *F21W 2107/30* (2018.01); *F21Y 2113/30* (2023.05)

(58) Field of Classification Search
CPC ..... B64D 47/06; F21S 43/10; F21W 2107/30; F21Y 2113/30
See application file for complete search history.

(56) References Cited

U.S. PATENT DOCUMENTS 9,061,772 B1   6/2015   Hartwell
9,758,259 B2   9/2017   Schoen
(Continued)

FOREIGN PATENT DOCUMENTS

EP            3572334 A1 * 11/2019   ............. B64D 47/04

OTHER PUBLICATIONS

European Patent Office; European Search Report dated Jun. 6, 2023 in Application No. 23151033.0.

*Primary Examiner* — Anne M Hines
(74) *Attorney, Agent, or Firm* — SNELL & WILMER L.L.P.

(57) ABSTRACT

A multi mode aircraft beacon light comprises a mounting portion for mounting the multi mode aircraft beacon light to an aircraft fuselage; at least one visible light source for emitting a visible beacon light output; a plurality of infra-red light sources for emitting an infrared beacon light output; an orientation sensor; and a controller, coupled to the orientation sensor for receiving an orientation sensor signal from the orientation sensor. The controller is configured to determine a mounting orientation of the multi mode aircraft beacon light from the orientation sensor signal, wherein the mounting orientation is indicative of whether the multi mode aircraft beacon light has an upper fuselage mounting position or a lower fuselage mounting position; and to selectively operate the plurality of infrared light sources, depending on the mounting orientation of the multi mode aircraft beacon light.

17 Claims, 6 Drawing Sheets

(51) Int. Cl.
 *F21W 107/30* (2018.01)
 *F21Y 113/00* (2016.01)

(56) References Cited

U.S. PATENT DOCUMENTS

| | | |
|---|---|---|
| 10,040,575 B2 | 8/2018 | Franich et al. |
| 10,919,644 B2 | 2/2021 | Pawliczek et al. |
| 11,097,855 B2 | 8/2021 | Jha et al. |
| 2011/0018439 A1 | 1/2011 | Fabbri et al. |
| 2019/0359348 A1 | 11/2019 | Pawliczek et al. |
| 2019/0382132 A1* | 12/2019 | Jha .......................... F21V 7/06 |
| 2020/0094987 A1 | 3/2020 | Hessling-Von Heimendahl et al. |

* cited by examiner

MULTI MODE AIRCRAFT BEACON LIGHT AND AIRCRAFT COMPRISING A MULTI MODE AIRCRAFT BEACON LIGHT

CROSS-REFERENCE TO RELATED APPLICATIONS

This application claims priority to, and the benefit of, EP patent application No. 23151033.0, filed Jan. 10, 2023 and titled "MULTI MODE AIRCRAFT BEACON LIGHT AND AIRCRAFT COMPRISING A MULTI MODE AIRCRAFT BEACON LIGHT," which is incorporated by reference herein in its entirety for all purposes.

FIELD

The present invention relates to exterior aircraft lighting. The present invention, in particular, relates to aircraft beacon lights and to aircraft equipped therewith.

BACKGROUND

Almost all aircraft are equipped with exterior lighting systems, including many different exterior lights. An exemplary group of exterior aircraft lights are lights for passive visibility, such as navigation lights, white strobe anti-collision lights, and red-flashing beacon lights. Aircraft often have two red-flashing beacon lights, including an upper aircraft beacon light, arranged on the top of the aircraft fuselage, and a lower aircraft beacon light, arranged on the bottom of the aircraft fuselage. Military aircraft may further include infrared beacon lights for emitting infrared light, which is not visible to the human eye, but which is detectable by appropriate infrared light sensors.

In military applications, the desired properties of the infrared light output of an infrared beacon light may differ between the upper and lower aircraft beacon lights. It may in particular be desired that the light output of a lower aircraft beacon light is spatially more restricted than the light output of an upper aircraft beacon light. In this case, two different types of aircraft beacon lights are provided as the upper aircraft beacon light and as the lower aircraft beacon light.

Accordingly, it would be beneficial to provide a multi mode aircraft beacon light that may be selectively employed as an upper aircraft beacon light, providing an upper aircraft beacon light output, and as a lower aircraft beacon light, providing a lower aircraft beacon light output.

SUMMARY

Exemplary embodiments of the invention include a multi mode aircraft beacon light comprising a mounting portion for mounting the aircraft beacon light to an aircraft fuselage; at least one visible light source for emitting a visible beacon light output; a plurality of infrared light sources for emitting an infrared beacon light output; an orientation sensor for providing an orientation sensor signal; and a controller. The orientation sensor is coupled to the controller for supplying the orientation sensor signal from the orientation sensor to the controller. The controller is configured for determining a mounting orientation of the aircraft beacon light from the orientation sensor signal. Said mounting orientation is indicative of whether the aircraft beacon light has an upper fuselage mounting position or a lower fuselage mounting position. The controller is further configured for selectively operating the plurality of infrared light sources of the aircraft beacon light, depending on the determined mounting orientation of the aircraft beacon light for selectively providing a lower aircraft beacon light output or an upper aircraft beacon light output.

Exemplary embodiments of the invention also include an aircraft, such as an airplane or a rotorcraft, comprising at least one multi mode aircraft beacon light according to an exemplary embodiment of the invention. The aircraft may in particular comprise a first multi mode aircraft beacon light, which is mounted as an upper aircraft beacon light to an upper portion of a fuselage of the aircraft, and/or a second multi mode aircraft beacon light, which is mounted as a lower aircraft beacon light to a lower portion of the fuselage of the aircraft.

A multi mode aircraft beacon light according to exemplary embodiments of the invention is able to selectively provide an upper infrared light output of an upper aircraft beacon light and a lower infrared light output of a lower aircraft beacon light, wherein the lower infrared light output differs from the upper infrared light output.

Thus, a multi mode aircraft beacon light according to exemplary embodiments of the invention may be selectively employed as an upper aircraft beacon light, which is mounted to an upper portion of an aircraft, and as a lower aircraft beacon light, which is mounted to a lower portion of an aircraft. In consequence, only a single type of aircraft beacon light, which may be selectively employed as an upper aircraft beacon light and as a lower aircraft beacon light, may suffice to provide the complete infrared beacon light functionality for an aircraft. As a result, the number of different components, which are required for equipping an aircraft with upper and lower beacon lights, may be reduced.

A multi mode aircraft beacon light according to exemplary embodiments of the invention is able to determine its mounting orientation, i.e. the orientation in which it is mounted to an aircraft, in an automated manner, and the correct operating mode of the multi mode aircraft beacon light may be selected by the controller in an automated manner, i.e. without human intervention. The risk of erroneously operating the multi mode aircraft beacon light as an upper aircraft beacon light, when it is mounted to a lower portion of an aircraft, or erroneously operating the multi mode aircraft beacon light as a lower aircraft beacon light, when it is mounted to an upper portion of an aircraft, may be reduced or even eliminated. The safety and/or the expected signaling behavior of aircraft that are equipped with multi mode aircraft beacon lights according to exemplary embodiments of the invention may be considerably enhanced.

The visible beacon light output of the multi mode aircraft beacon light may be a red-flashing beacon light output or a white-flashing beacon light output or a combination of a white-flashing beacon light output and a red-flashing beacon light output. The infrared beacon light output of the multi mode aircraft beacon light may be a flashing infrared beacon light output.

In an embodiment, the orientation sensor comprises an inertial sensor, which is configured for detecting its orientation with respect to gravity. An inertial sensor may be a particularly reliable kind of sensor for determining the orientation of the multi mode aircraft beacon light with respect to the gravitational field of the earth.

In an embodiment, the orientation sensor comprises an optical sensor/photo sensor, which is configured for detecting light, in particular for detecting sunlight. As the sun is located above the aircraft, unless the aircraft is flown in an unusual upside down orientation, an optical sensor/photo sensor may also allow for determining whether the multi mode aircraft beacon light is located on the upper side or on the lower side of the aircraft in a reliable manner. This is in particular the case, when the aircraft is located on the ground.

In an embodiment, the orientation sensor comprises both, an inertial sensor and a photo sensor, and the controller is configured for evaluating the sensor signals provided by both sensors for determining the orientation of the multi mode aircraft beacon light. Combining the sensor signals, provided by two or more orientation sensors, may enhance the reliability of the determined orientation of the aircraft beacon light.

In an embodiment, the controller is configured for determining the mounting orientation of the aircraft beacon light only after stable conditions, in particular a stable orientation of the aircraft and/or a stable orientation sensor signal, have been detected. The conditions may be deemed stable if the orientation sensor signal indicates the same orientation for a predetermined amount of time. This may allow for preventing an erroneous determination of the mounting orientation of the aircraft beacon light due to erroneous orientation sensor signals, which may be provided by the orientation sensor during unstable flight conditions of the aircraft. The controller may in particular be configured for determining the mounting orientation of the aircraft beacon light only after stable conditions have been detected for a predetermined amount of time, for example for at least 5, 10 or 15 minutes, after the aircraft beacon light has been activated for the first time.

In an embodiment, determining the mounting orientation of the aircraft beacon light may include determining and evaluating an average, in particular a weighted average, of a plurality of orientation sensor signals, provided by the orientation sensor over a predetermined period of time, in order to prevent a false determination of the mounting orientation of the aircraft beacon light.

In an embodiment, the controller is configured for making a permanent determination about the mounting orientation of the aircraft beacon light from the orientation sensor signal supplied by the orientation sensor. After having made the permanent determination about the mounting orientation of the aircraft beacon light, the controller does not change said determination. In other words, once the controller has determined, based on the orientation sensor signal supplied by the orientation sensor, that the aircraft beacon light is mounted as an upper aircraft beacon light to a top portion of the fuselage, this determination will be fixed for the lifetime of the aircraft beacon light or at least until a full reset of the aircraft beacon light, and said aircraft beacon light will not be considered a lower aircraft beacon light, which is mounted to a bottom portion of the fuselage. Similarly, once the controller has determined, based on the orientation sensor signal supplied by the orientation sensor, that the aircraft beacon light is mounted as a lower aircraft beacon light to a bottom portion of the fuselage, this determination will be fixed for the lifetime of the aircraft beacon light or at least until a full reset of the aircraft beacon light, and said aircraft beacon light will not be considered an upper aircraft beacon light, which is mounted to an upper portion of the fuselage.

Making a permanent determination about the mounting orientation of the aircraft beacon light may allow for preventing erroneous accidental changes of the determined mounting orientation of the aircraft beacon light due to unusual flight conditions of the aircraft, for example flight conditions, in which the aircraft is temporarily flying in an upside down orientation.

In an embodiment, the determined mounting orientation of the aircraft beacon light is written into a permanent memory of the controller for permanently fixing the mounting orientation.

In an embodiment, the determined mounting orientation is additionally indicated by a visual indicator, which is visible from outside the aircraft beacon light, in order to allow for unambiguously identifying the determined mounting orientation of the aircraft beacon light, e.g. during pre-flight checks. A visual indicator, indicating the determined mounting orientation of the aircraft beacon light, may help in preventing that the aircraft beacon light is re-mounted in a wrong orientation to an aircraft, after it has been separated from the aircraft for repair and/or maintenance.

In an embodiment, the plurality of infrared light sources include a first subset of infrared light sources and a second subset of infrared light sources. The first subset of infrared light sources may be associated with at least one first optical element, and the second subset of infrared light sources may be associated with at least one second optical element, respectively.

In an embodiment comprising a first subset of infrared light sources and a second subset of infrared light sources, the controller may be configured for operating the first subset of infrared light sources, in particular operating only the first subset of infrared light sources, when the mounting orientation indicates the upper fuselage mounting position. The controller may further be configured for operating the second subset of infrared light source, in particular operating only the second subset of infrared light sources, when the mounting orientation indicates the lower fuselage mounting position. When operated, the first subset of infrared light sources provide an upper infrared beacon light output. When operated, the second subset of infrared light sources provide a lower infrared beacon light output. The characteristics, such as the light intensity distribution, of the upper and lower infrared beacon light outputs may be shaped by the least one first optical element and by the least one second optical element, respectively.

An embodiment comprising a first subset of infrared light sources and a second subset of infrared light sources may allow for the aircraft beacon light to selectively output an upper infrared beacon light output or a lower infrared beacon light output by selectively operating the first subset and/or second subset of infrared light sources. In consequence, such an aircraft beacon light may be switched easily between an upper infrared beacon light output and a lower infrared beacon light output by selectively activating and deactivating the respective subsets of infrared light sources.

In an embodiment, the first and second subsets of infrared light sources are both operated by the controller, when the mounting orientation indicates the upper fuselage mounting position, but only the second subset of infrared light sources are operated by the controller, when the mounting orientation indicates the lower fuselage mounting position.

Such an embodiment may allow for the aircraft beacon light to selectively output an upper infrared beacon light output and a lower infrared beacon light output by selectively activating and deactivating the second subset of infrared light sources. As a result, an aircraft beacon light according to such an embodiment may be switched easily between an upper infrared beacon light output and a lower infrared beacon light output. Since according to this embodiment, both subsets of infrared light sources are activated for providing the upper infrared beacon light output, the intensity of the upper infrared beacon light output may be higher than in embodiments in which only one subset of infrared light sources is activated for providing the upper infrared beacon light output.

In an embodiment, the first subset of infrared light sources comprises a plurality of infrared light sources, and each light source of the first subset of infrared light sources has a respective first optical element associated therewith for shaping the infrared light output emitted by the infrared light sources of the first subset. Said respective first optical element may in particular comprise a respective first reflector and/or a respective first lens.

In an embodiment, the second subset of infrared light sources comprises a plurality of infrared light sources, and each light source of the second subset of infrared light sources has a respective second optical element associated therewith for shaping the infrared light output emitted by the infrared light sources of the second subset. Said respective second optical element may in particular comprise a respective second reflector and/or a respective second lens.

In an embodiment, the aircraft beacon light further comprises at least one third optical element for generating a visible light output from light emitted by the at least one visible light source. The at least one third optical element may comprise at least one lens and/or at least one reflector. Providing the at least one third optical element may allow for shaping the visible light output of the aircraft beacon light into a desired manner, in particular for providing light emission characteristics that comply with FAR requirements for anti-collision lights.

In an embodiment, the at least one visible light source is exactly one visible light source.

In an alternative embodiment, the at least one visible light source is a plurality of visible light sources.

In an embodiment, the plurality of visible light sources are arranged in an annular configuration, in particular in a circular configuration. Arranging the plurality of visible light sources in an annular configuration may allow for a highly uniform output of visible light 360° around the aircraft beacon light.

In an embodiment, a projection of an upper infrared beacon light output onto a vertical plane, extending vertically through the aircraft beacon light when it its mounted to an aircraft, has a larger opening angle within said vertical plane than the lower infrared beacon light output. The projection of the upper infrared beacon light output may be obtained by projecting parts of the light output outside of the vertical plane onto the vertical plane. The term projection, as used herein, is also intended to encompass the comparison between the upper infrared beacon light output and the lower infrared beacon light output in a single vertical cross-sectional plane or in a plurality of vertical cross-sectional planes.

In an embodiment, the projection of the upper infrared beacon light output onto the vertical plane has an opening angle of between 70° and 90°, in particular an opening angle of between 75° and 85°. In an embodiment, the projection of the lower infrared beacon light output onto the vertical plane has an opening angle of between 25° and 50°, in particular an opening angle of between 30° and 45°.

In an embodiment, the plurality of infrared light sources are arranged in an annular configuration. The plurality of infrared light sources may in particular be arranged in a circular configuration. Arranging the plurality of infrared light sources in an annular configuration may allow for a highly uniform output of infrared light 360° around the aircraft beacon light.

In an embodiment, the infrared light sources of the first subset and the infrared light sources of the second subset are arranged in an alternating manner.

In an embodiment, each infrared light source of the first subset of infrared light sources is arranged as a single infrared light source between two infrared light sources of the second subset of infrared light sources. Similarly, each infrared light source of the second subset of infrared light sources is arranged as a single infrared light source between two infrared light sources of the first subset of infrared light sources. In other words, single infrared light sources of the first and second subsets of infrared light sources are arranged in an alternating manner next to each other along the annular configuration of infrared light sources.

In another embodiment, the infrared light sources are arranged in groups of infrared light sources. The groups of infrared light sources may include first groups of infrared light sources, with each of the first groups comprising a plurality of infrared light sources of the first subset of infrared light sources, and second groups of infrared light sources, with each of the second groups comprising a plurality of infrared light sources of the second subset of infrared light sources, respectively.

The first and second groups of light sources may be arranged next to each other in an alternating manner. In other words, each of the first groups of infrared light sources, comprising two, three, four or more infrared light sources of the first subset of infrared light sources, may be arranged between two of the second groups of infrared light sources, with each of the second groups comprising two, three, four or more infrared light sources of the second subset of infrared light sources. Similarly, each of the second groups of infrared light sources may be arranged between two of the first groups of infrared light sources.

The first and second groups of infrared light sources may comprise the same number of infrared light sources. In an alternative embodiment, the first groups of infrared light sources may comprise a different number of infrared light sources than the second groups of infrared light sources.

In an embodiment, the controller is configured for operating all of the plurality of infrared light sources, when the mounting orientation indicates the upper fuselage mounting position. Operating all of the plurality of infrared light sources may provide an infrared light output with a particularly high light intensity.

In an embodiment, the controller is configured to disable all of the plurality of infrared light sources, when the mounting orientation indicates the lower fuselage mounting position. In such an embodiment, there is no emission of infrared light towards the ground below the aircraft, when the mounting orientation indicates the lower fuselage mounting position.

In an embodiment having a plurality of visible light sources, the plurality of infrared light sources may be arranged outside of the annular configuration of the plurality of visible light sources. The plurality of visible light sources may in particular, be arranged on an inner ring of visible light sources, and the plurality of infrared light sources may in particular, be arranged on an outer ring of infrared light sources, with the outer ring being arranged outside the inner ring of visible light sources.

In an alternative embodiment, the plurality of infrared light sources may be arranged inside the annular configuration of the plurality of visible light sources.

In yet another configuration, the plurality of infrared light sources and the plurality of visible light sources may be arranged together in an integrated annular configuration. The plurality of infrared light sources and the plurality of visible light sources may for example, be arranged next to each other in an alternating manner along an integrated annular configuration.

In an embodiment, the plurality of visible light sources comprise red light sources for emitting red light and/or white light sources for emitting white light.

In an embodiment comprising a plurality of red light sources and a plurality of white light sources, the plurality of red light sources and the plurality of white light sources may be arranged in an integrated annular configuration. The plurality of red light sources and the plurality of white light sources may for example, be arranged next to each other in an alternating manner along the integrated annular configuration.

In an embodiment comprising a plurality of red light sources and a plurality of white light sources, the red light sources and the white light sources may be switchable independently of each other for allowing the multi mode aircraft beacon light to selectively emit white and/or red light. In an alternative embodiment the red light sources and the white light sources may be switchable together.

In an embodiment having exactly one visible light source, the plurality of infrared light sources may be arranged around the visible light source. The visible light source may in particular be arranged in a center portion of the multi mode aircraft beacon light.

In an embodiment, the multi mode aircraft beacon light may comprise a red color filter for converting white light, which is emitted by one or more white light sources, into red light. The red color filter may be mounted to or integrated with a light transmissive cover of the multi mode aircraft beacon light.

Exemplary embodiments of the invention further include a method of installing and operating a multi mode aircraft beacon light, with the multi mode aircraft beacon light comprising at least one visible light source for emitting a visible beacon light output and a plurality of infrared light sources for emitting an infrared beacon light output, wherein the method includes: mounting the aircraft beacon light to an upper portion of an aircraft fuselage or mounting the aircraft beacon light to a lower portion of the aircraft fuselage; determining a mounting orientation of the aircraft beacon light with an orientation sensor of the aircraft beacon light, after the aircraft beacon light has been mounted to the aircraft fuselage; and selectively operating the plurality of infrared light sources, depending on the determined mounting orientation of the multi mode aircraft beacon light. The additional features, modifications, and effects, as described above with respect to the multi mode aircraft beacon light, may apply to the method of installing and operating a multi mode aircraft beacon light in an analogous manner. In particular, the method of installing and operating a multi mode aircraft beacon light may be a method of installing and operating a multi mode aircraft beacon light according to any of the embodiments described above.

In an embodiment, the aircraft beacon light comprises a first subset of infrared light sources and a second subset of infrared light sources, and the method of installing and operating a multi mode aircraft beacon light includes operating the first subset of infrared light sources, in particular operating only the first subset of infrared light sources, when the mounting orientation indicates an upper fuselage mounting position; and the method further includes operating the second subset of infrared light sources, in particular operating only the second subset of infrared light sources, when the mounting orientation indicates a lower fuselage mounting position.

In an embodiment, the method includes deactivating the plurality of infrared light sources if a lower fuselage mounting position of the aircraft beacon light is detected, and the method includes activating the plurality of infrared light sources if an upper fuselage mounting position of the aircraft beacon light is detected.

Selectively activating and deactivating the plurality of infrared light sources or respective subsets of the plurality of infrared light sources may allow for restricting a spatial sector, into which infrared light is emitted, if the aircraft beacon light is detected to be mounted as a lower aircraft beacon light, as compared to a configuration in which the aircraft beacon light is detected to be mounted as an upper aircraft beacon light.

In an embodiment, the method includes making the determination about the mounting orientation of the aircraft beacon light after having received a consistent orientation sensor signal from the orientation sensor for at least a predetermined amount of time and/or after having received a predetermined number of consistent orientation sensor readings from the orientation sensor.

In an embodiment, the method includes activating or deactivating the plurality of infrared light sources/respective subsets of the plurality of light sources only a predetermined amount of time after the aircraft has been started and the orientation of the aircraft beacon light has been detected with a predefined level of reliability.

In an embodiment, the method includes making a permanent determination about the mounting orientation of the aircraft beacon light from the orientation sensor signal, supplied by the orientation sensor, and not changing the determination about the mounting orientation of the aircraft beacon light after the permanent determination about the mounting orientation of the aircraft beacon light has been made.

BRIEF DESCRIPTION OF THE DRAWINGS

Further embodiments of the invention will be described below with respect to the accompanying drawings, wherein.

DETAILED DESCRIPTION

Figure 1:
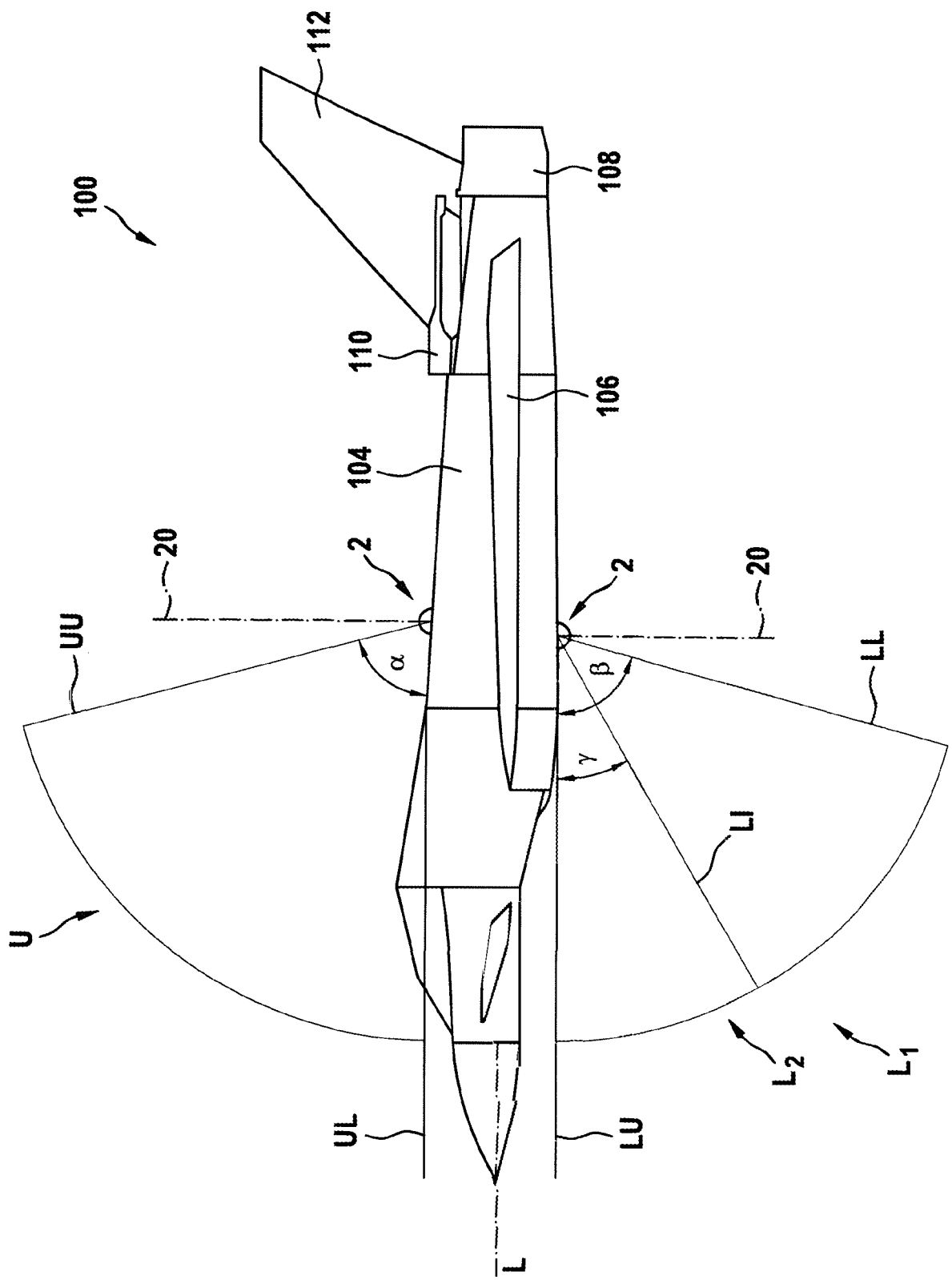
FIG. 1 shows a schematic side view of an aircraft, which is equipped with two multi mode aircraft beacon lights in accordance with exemplary embodiments of the invention.

FIG. 1 shows a schematic side view of an aircraft 100 in accordance with an exemplary embodiment of the invention. The aircraft 100 depicted in FIG. 1 is an airplane, in particular a military airplane. It is pointed out that other types of aircraft may be equipped with multi mode aircraft beacon lights 2 in accordance with exemplary embodiments of the present invention as well.

The aircraft 100 has a fuselage 104, extending along a longitudinal axis L. Two wings 106 are attached to the right and to the left of the fuselage 104. Only the wing 106 attached to the left side of the fuselage is visible in the side view depicted in FIG. 1.

The aircraft 100 has engine 108 located at a tail portion of the fuselage 104. In other embodiments, which are not shown in the Figures, the aircraft 100 may comprise multiple engines 108, which may also be mounted to the wings 106 of the aircraft 100.

Further, two horizontal stabilizers 110, only one of which is visible in FIG. 1, and a vertical stabilizer 112 are mounted to a tail portion of the fuselage 104. Again, it is pointed out that aircraft 100 in accordance with other designs and constructions are encompassed by exemplary embodiments of the present invention.

The aircraft 100 further comprises two multi mode aircraft beacon lights 2, mounted to the fuselage 104. A first aircraft beacon light 2 is mounted as an upper aircraft beacon light 2 to a top portion of the fuselage 104. A second aircraft beacon light 2 is mounted as a lower aircraft beacon light 2 to a bottom portion or belly of the fuselage 104.

The two multi mode aircraft beacon lights 2 are configured for selectively emitting visible light and/or infrared light. Each of the two multi mode aircraft beacon lights 2 may in particular be switchable between a visible light emission mode, in which the multi mode aircraft beacon light 2 emits visible light, in particular white light and/or red light, and an infrared light emission mode, in which the multi mode aircraft beacon light 2 emits infrared light, and a dual light emission mode, in which the multi mode aircraft beacon light 2 emits both, visible light and infrared light.

The upper aircraft beacon light 2, which is mounted to the top of the fuselage 104, is configured for emitting visible light and/or infrared light into an upper spatial sector U. When projected onto a vertical plane extending through the upper aircraft beacon light 2 and along the longitudinal axis L of the aircraft 100, the upper spatial sector U is defined by a lower boundary UL, which extends substantially parallel to the longitudinal axis L of the aircraft 100 in the exemplary embodiment of FIG. 1, and an upper boundary UU, which is oriented upwards with respect to the lower boundary UL. An opening angle α of the upper spatial sector U, i.e. the angle α between the upper boundary UU and the lower boundary UL of the upper spatial sector U in the given vertical plane, may be at least 75°. The opening angle α of the upper spatial sector U may in particular be in the range of between 75° and 90°.

The lower aircraft beacon light 2, which is mounted to the bottom of the fuselage 104, is configured for emitting visible light, in particular white and/or red light, into a first lower spatial sector L1, and for emitting infrared light into a second lower spatial sector L2.

The first lower spatial sector L1 is basically mirror symmetrical to the upper spatial sector U with respect to a horizontal plane encompassing the longitudinal axis L of the aircraft 100. When projected onto the vertical plane extending through the lower aircraft beacon light 2 and along the longitudinal axis L of the aircraft 100, the first lower spatial sector L1 is defined by an upper boundary LU, which extends substantially parallel to the longitudinal axis L of the aircraft 100 in the exemplary embodiment of FIG. 1, and a lower boundary LL, which is oriented downwards with respect to the upper boundary LU. The opening angle β of the first lower spatial sector L1, i.e. the angle β between the upper boundary LU and the lower boundary LL of the first lower spatial sector L1 in the given vertical plane, may be at least 75°. The opening angle β of the first lower spatial sector L1 may in particular be in the range of between 75° and 90°.

The second lower spatial sector L2 has a smaller opening angle γ than the first lower spatial sector L1. When projected onto the vertical plane extending through the lower aircraft beacon light 2 and along the longitudinal axis L of the aircraft 100, the second lower spatial sector L2 is defined by the upper boundary LU, which extends substantially parallel to the longitudinal axis L of the aircraft 100 in the exemplary embodiment of FIG. 1, and a lower boundary LI, which is oriented downwards with respect to the upper boundary LU. The opening angle γ of the second lower spatial sector L2, i.e. the angle γ between the upper boundary LU and the lower boundary LI of the second lower spatial sector L2, may be in the range of between 25° and 50°. The opening angle γ of the second lower spatial sector L2 in the given vertical plane may in particular be in the range of between 30° and 45°, more particularly, the opening angle γ of the second lower spatial sector L2 may be 30°.

For enhancing the clarity of illustration, the upper spatial sector U, the first lower spatial sector L1, and the second lower spatial sector L2 are depicted in FIG. 1 as only extending from the respective aircraft beacon light 2 into a forward direction of the aircraft 100.

The light outputs emitted by the aircraft beacon lights 2 are, however, rotationally symmetric with respect to an axis of symmetry 20, extending through the respective aircraft beacon light 2. Said axis of symmetry 20 extends through the aircraft beacon light 2 in a vertical direction, i.e. orthogonal to the longitudinal axis L of the aircraft 100.

According to an exemplary embodiment of the invention, the same type of multi mode aircraft beacon light 2 is used as the upper aircraft beacon light and as the lower aircraft beacon light. A multi mode aircraft beacon light 2 according to an exemplary embodiment of the invention is configured for determining its mounting orientation with respect to the aircraft 100, with the mounting orientation being indicative of whether the multi mode aircraft beacon light 2 is mounted as an upper aircraft beacon light in an upper fuselage mounting position or as a lower aircraft beacon light in a lower fuselage mounting position.

A multi mode aircraft beacon light 2 according to an exemplary embodiment of the invention is further configured for selectively emitting infrared light into a wide spatial sector, such as the upper spatial sector U depicted in FIG. 1, when it is mounted as an upper aircraft beacon light in an upper fuselage mounting position. The multi mode aircraft beacon light 2 is further configured for emitting infrared light into a more narrow spatial sector, such as the second lower spatial sector L2 depicted in FIG. 1, when it is mounted as a lower aircraft beacon light in a lower fuselage mounting position.

Details of a multi mode aircraft beacon light 2 according to an exemplary embodiment of the invention are described in the following with respect for FIGS. 2 to 8. For ease of readability, the multi mode aircraft beacon light 2 according to an exemplary embodiment of the invention will be referred to simply as aircraft beacon light 2 in the following.

Figure 2:
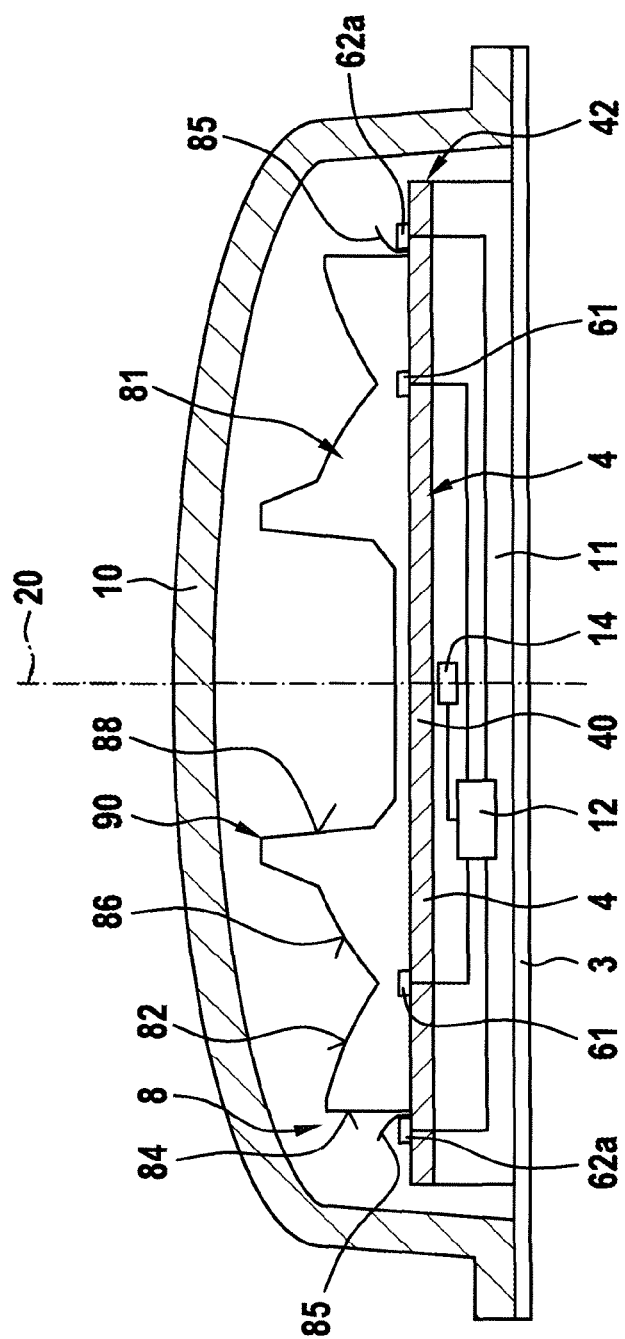
FIG. 2 shows a vertical cross-sectional view of a multi mode aircraft beacon light in accordance with an exemplary embodiment of the invention.

FIG. 2 shows a vertical cross-sectional view of an aircraft beacon light 2 according to an exemplary embodiment of the invention.

The aircraft beacon light 2 has a mounting portion 3, which is configured for mounting the aircraft beacon light 2 to the aircraft 100, in particular to the fuselage 104 of the aircraft 100, as it is depicted in FIG. 1.

The aircraft beacon light 2 further comprises a disk-shaped support plate 4. The support plate 4 has a central portion 40. A plurality of light sources 61, 62a, 62b, including inner light sources 61 and outer light sources 62a, 62b, are arranged around the central portion 40 of the support plate 4. The light sources 61, 62a, 62b may be LEDs.

Figure 3:
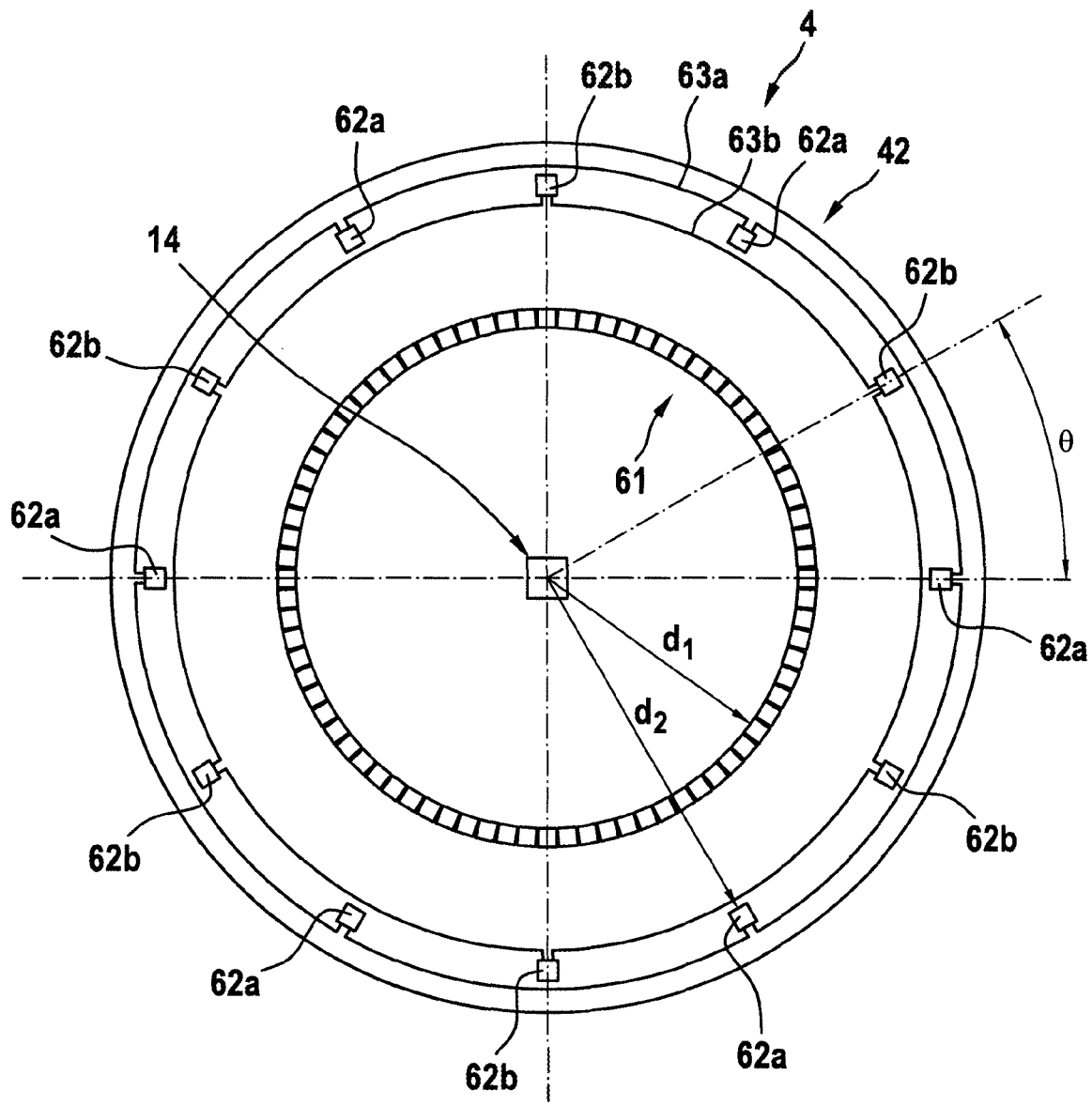
FIG. 3 shows a plan view of a support plate supporting light sources of a multi mode aircraft beacon light in accordance with an exemplary embodiment of the invention.

FIG. 3 shows a plan view of the support plate 4 with the light sources 61, 62a, 62b.

The aircraft beacon light 2 has an n-fold rotational symmetry with respect to a central axis of symmetry 20. The cross-sectional view shown in FIG. 2 may therefore be any vertical cross-sectional view going through the axis of symmetry 20 of the aircraft beacon light 2 and cutting through two of the outer light sources 62a mounted to the support plate 4. For ease of reference, it is assumed that the depicted cross-sectional view is a longitudinal vertical cross-sectional view in an aircraft frame of reference, i.e. a vertical cross-sectional view extending through the longitudinal axis L of the aircraft 100.

The support plate 4 is supported by a support structure 11, which is arranged between the support plate 4 and the mounting portion 3. The mounting portion 3 may in particular, be formed integrally with the support structure 11. The support structure 11 provides mechanical support to the support plate 4. It further provides a cooling structure and a cooling space for transferring heat, which is generated when the light sources 61, 62a, 62b are operated, away from the light sources 61, 62a, 62b.

In the exemplary embodiment depicted in FIGS. 2 and 3, the plurality of light sources 61, 62a, 62b are arranged in a circular manner around the axis of symmetry 20. The plurality of light sources 61, 62a, 62b are in particular arranged between the central portion 40 of the support plate 4 and a circumferential periphery 42 of the support plate 4. In the cross-sectional view of FIG. 2, four light sources are shown.

The light sources 61, 62a, 62b include a plurality of inner light sources 61 and a plurality of outer light sources 62a, 62b. The inner light sources 61 are mounted to the support plate 4 in an annular configuration at a first distance d1 from the axis of symmetry 20, and the outer light sources 62a, 62b are mounted to the support plate 4 in an annular configuration at a second distance d2 from the axis of symmetry 20, which is larger than the first distance d1, as may be seen particularly well in FIG. 3.

The first distance d1 may for example, be in the range of between 15 mm and 60 mm, and the second distance d2 may for example, be in the range of between 30 mm and 80 mm. The difference between the second distance d1 and the first distance d2 may be between 5 mm and 25 mm.

The inner light sources 61 are visible light sources 61, which are configured for emitting visible light, in particular white light and/or red light. An aircraft beacon light 2 according to an exemplary embodiment of the invention may comprise, for example, between 8 and 120 visible light sources 61.

Optionally, the inner light sources 61 may include a first subset of inner light sources 61 for emitting white light and a second subset of inner light sources 61 for emitting red light. The first and second subsets of inner light sources 61 may be switchable independently of each other, so that the aircraft beacon light 2 is able to selectively emit red light, white light, or a mixture or combination comprising red light and white light.

It is also possible that a single inner light source, i.e. a single visible light source, may be provided. This single inner light source may be arranged at the or close to the center of the support plate 4.

The outer light sources 62a, 62b are infrared light sources 62a, 62b, which are configured for emitting infrared light.

In the exemplary embodiment depicted in FIG. 3, the plurality of outer light sources 62a, 62b comprise twelve outer light sources, which are arranged at angular distances θ of 30° with respect to each other. This configuration is, however, only exemplary. An aircraft beacon light 2 according to an exemplary embodiment of the invention may comprise more or less than twelve outer light sources 62a, 62b, with the angular distances of adjacent outer light sources 62a, 62b being adjusted accordingly.

In the exemplary embodiment depicted in FIG. 3, the plurality of outer light sources 62a, 62b comprise a first subset of six outer light sources 62a for emitting infrared light into a first spatial sector having an opening angle α of at least 70° in the vertical plane, in particular an opening angle α in the range of between 70° and 90° (cf. FIG. 1), and a second subset of six outer light sources 62b for emitting infrared light into a second spatial sector having an opening angle γ in the range of between 25° and 50° in the vertical plane, in particular an opening angle γ of 30° (cf. FIG. 1). The outer light sources 62a, 62b of the first and second subsets are arranged in an alternating manner along the outer periphery of the support plate 4.

The outer light sources 62a of the first subset are electrically coupled in series by a first conductive path 56a, which is formed on or within the support plate 4. The outer light source 62b of the second subset are electrically coupled in series by a second conductive path 63b, which is formed on or within the support plate 4.

In the exemplary embodied depicted in FIG. 3, a single outer light source 62a of the first subset is arranged between each pair of two outer light sources 62b of the second subset, and a single outer light source 62b of the second subset is arranged between each pair of two outer light sources 62a of the first subset.

In alternative embodiments, which are not explicitly depicted in the Figures, the outer light sources 62a, 62b may be arranged in groups of light sources, including first groups of outer light sources 62a, comprising a plurality of outer light sources 62a of the first subset of outer light sources 62a, and second groups of outer light sources 62b, comprising a plurality of outer light sources 62b of the second subset of outer light sources 62b. The first and second groups of outer light sources 62a, 62b may be arranged next to each other in an alternating manner along the annular configuration.

In other words, along the circumferential periphery 42 of the support plate 4, first groups of outer light sources 62a, comprising two, three, four or more outer light sources 62a of the first subset of outer light sources 62a, may be arranged between second groups of outer light sources 62b, comprising two, three, four or more outer light sources 62b of the second subset of outer light sources 62b, and vice versa.

The first and second groups of outer light sources 62a, 62b may comprise the same number of outer light sources; alternatively, the first groups of outer light sources 62a may comprise a different number of outer light sources than the second groups of outer light sources.

A controller 12 is provided in or at the support structure 11. In an alternative embodiment, the controller 12 may be provided separately from the support structure 11.

The controller 12 is electrically coupled to the light sources 61, 62a, 62b via conductive paths. The controller 12 is configured for effecting a pulsed power supply to the light sources 61, 62a, 62b in operation. In this way, the plurality of light sources 61, 62a, 62b provide for a flashing effect of the aircraft beacon light 2.

The controller 12 may be coupled to an on-board power supply network or to an according power adapter (not shown), and it may pass on the received electric power to the light sources 61, 62a, 62b. The controller 12 may be embodied entirely in hardware or it may comprise a suitable combination of hardware and software for achieving the desired control of the light sources 61, 62a, 62b. It is also possible that the support plate 4 is a printed circuit board (PCB), carrying all power connections to the plurality of light sources 61, 62a, 62b and according to control circuitry.

The aircraft beacon light 2 further comprises an orientation sensor 14, which is coupled to the controller 12. The orientation sensor 14 may also be located in or at the support structure 11. The orientation sensor 14 may in particular be integrated with the controller 12. The functionality and the use of the orientation sensor 14 will be discussed further below.

The aircraft beacon light 2 further comprises an optical structure 8 for shaping the light, emitted by the light sources 61, 62a, 62b, into a desired light output of the aircraft beacon light 2. The optical structure 8 is shown in FIG. 2, but not in FIG. 3.

The aircraft beacon light 2 further comprises a light transmissive cover 10, which is also shown in FIG. 2, but not in FIG. 3. The light transmissive cover 10 is mounted to the support structure 11 and forms an inner space between the support structure 11 and the light transmissive cover 10, in which the support plate 4, the light sources 61, 62a, 62b and the optical structure 8 are arranged. The light transmissive cover 10 thus protects the optical structure 8, the light sources 61, 62a, 62b, and the support plate 4 during flight of the aircraft.

The light transmissive cover 10 may also comprise a red color filter. In this case, the plurality of visible light sources 61 may be white light sources, such as white LEDs, with the red color filter achieving an emission of red light flashes, as seen by the observer. It is also possible that a red color filter is provided as an additional structure, for example between the optical structure 8 and the light transmissive cover 10 or between the plurality of visible light sources 61 and the optical structure 8.

In the exemplary embodiment of FIG. 2, the optical structure 8 comprises a unitary, rotationally symmetric lens 81, which is arranged within the aircraft beacon light 2 for conditioning the light outputs emitted by the inner light sources 61.

The lens 81 is an annular structure that is arranged over the plurality of inner light sources 61 on the support plate 4 around the central portion 40 thereof. The lens 81 may be made from silicone, and it may be molded over the plurality of inner light sources 61 onto the support plate 4. In other words, during manufacture, the material of the lens 81 may be brought into its eventual shape in a molding process right over the plurality of inner light sources 61 and the support plate 4. It is also possible that the lens 81 is molded as a separate element, which is attached to the support plate 4, enclosing the plurality of inner light sources 61 between the support plate 4 and the lens 81.

As the lens 81 is a rotationally symmetric component, the cross-sectional view of FIG. 2 shows two mirror-symmetrical portions of the optical structure 8 towards the left and towards the right of the central portion 40 of the support plate 4. It is understood that the individual surfaces and portions of the lens 81, which will be described below, extend around the central portion 40 of the support plate 4 in a revolving manner. It is further understood that the lens 81 may also be continuous through the central portion 40 of the support plate 4 and may thus cover a large portion of the support plate 4.

The lens 81 shapes the light, emitted by the visible light sources 61, into a visible light output that illuminates the upper spatial sector U or the first lower spatial sector L1 (cf. FIG. 1), respectively.

The lens 81 has a light entry surface, which is the boundary surface with the plurality of visible light sources 61, a first total internal reflection surface 82, which is distal from the support plate 4 and positioned laterally outwards of the plurality of visible light sources 61, a second total internal reflection surface 86, which is distal from the support plate 4 and laterally inwards of the plurality of visible light sources 61, a first light exit surface 84, which is substantially orthogonal to the support plate 4 and forms the laterally outermost part of the lens 81, and a second light exit surface 88, which is substantially orthogonal to the support plate 4 and which is positioned between the plurality of visible light sources 61 and the central portion 40 of the support plate 4, i.e. laterally inwards of the plurality of the visible light sources 61 and the second total internal reflection surface 86.

In addition, the lens 81 of the exemplary embodiment of FIG. 2 comprises a refractive portion 90, which forms the most distal part of the lens 81 with respect to the support plate 4 and which is arranged between the second light exit surface 88 and the second total internal reflection surface 86, when considering the distance from the axis of symmetry 20.

Figure 4:
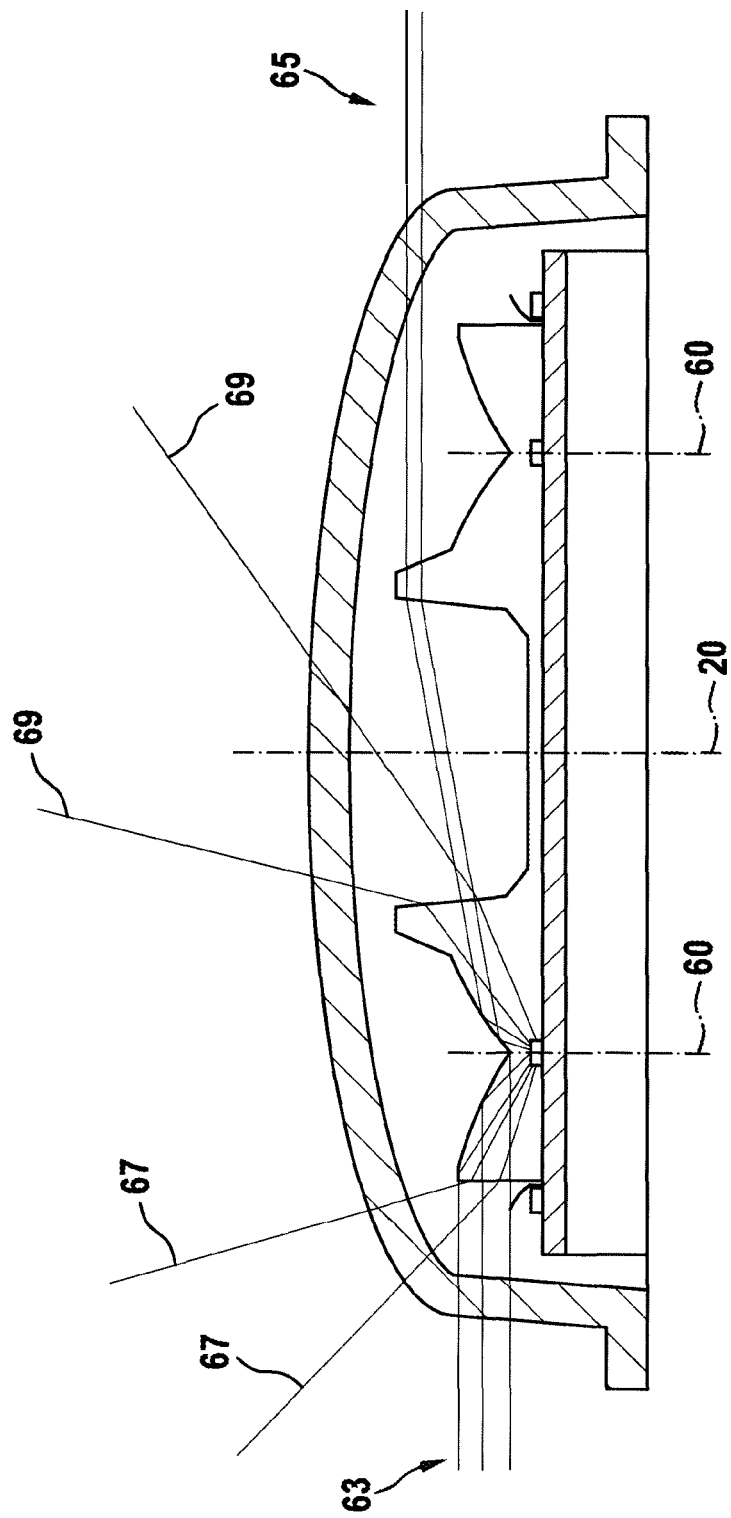
FIG. 4 shows the aircraft beacon light of FIG. 2 in the same cross-sectional view, with exemplary light rays illustrating the visible beacon light output of the multi mode aircraft beacon light.

FIG. 4 shows the aircraft beacon light 2 of FIG. 2 in the same cross-sectional view. FIG. 4 additionally shows exemplary light rays 63, 65, 67, 69, as emitted by the visible light source 61 depicted on the left hand side of FIG. 4. For enhancing the clarity of the illustration, no light rays emitted by the visible light source 61, which is depicted on the right hand side of FIG. 4, are shown.

In order to draw better attention to the exemplary light rays 63, 65, 67, 69, the reference numerals to the individual surfaces and portions of the lens 81 are omitted from FIG. 4. It is pointed out that the reference numerals of FIG. 2 apply to FIG. 4 in complete analogy.

For ease of illustration, the principal light emission directions 60 of the visible light sources 61 are indicated as dashed lines in FIG. 4, which are oriented orthogonal to the support plate 4. The visible light sources 61 are directed light sources, with the principal light emission direction 60 extending orthogonal to the plane of the support plate 4.

A first portion of the light, emitted by the visible light sources 61, enters the lens 81 right after exiting the visible light sources 61, reaches the first total internal reflection surface 82, experiences total internal reflection at the first total internal reflection surface 82, and is reflected laterally outwards. The exemplary light rays 63, which illustrate said first portion of light, hit the first light exit surface 84 in an orthogonal manner and, therefore, pass the first light exit surface 84 without further refraction.

While being reflected laterally outwards, the first portion of light is collimated in a direction parallel to the support plate 4, i.e. it is collimated within the horizontal plane in the aircraft frame of reference (cf. FIG. 1). For achieving said collimation, the first total internal reflection surface 82 has a parabolic shape in cross-section, as illustrated in FIGS. 2 and 4. The first portion of light encompasses the light as output by the plurality of visible light sources 61 in an angular range of about 45° between the principal light emission directions 60 and 45° laterally outwards thereof.

A second portion of light enters the lens 81 from the plurality of visible light sources 61, reaches the second total internal reflection surface 86, experiences total internal reflection at the second total internal reflection surface 86, and exits the lens 81 for a first time at the second light exit surface 88. The second portion of light is illustrated via exemplary light rays 65.

The second total internal reflection surface 86 is also parabolic. However, the parabolic shape is tilted in such a way with respect to the support plate 4 that the exemplary light rays 65 are not collimated parallel to the support plate 4, but somewhat angled upwards with respect to the support plate 4. The exemplary light rays 65 of the second portion of light experience an additional refraction at the second light exit surface 88. The second portion of light, after passing the second light exit surface 88, re-enters the optical structure 8 at the refractive portion 90. The refractive portion 90 refracts the second portion of light to be parallel or close to parallel with respect to the support plate 4. In this way, the second portion of light is also emitted in or close to the horizontal plane of the aircraft 100 in the aircraft frame of reference. The second portion of light encompasses the light as output by the plurality of visible light sources 61 in an angular range of about 30° between the principal light emission directions 60 and 30° laterally inwards thereof.

A third portion of light emitted by the visible light sources 61, which is illustrated by exemplary light rays 67, enters the lens 81 after being emitted by the visible light sources 61 and propagates left to the first light exit surface 84. There, the third portion of light is refracted into various angular directions. The third portion of light encompasses the light as output by the plurality of visible light sources 61 in an angular range of about 45° between 45° laterally outwards of the principal light emission directions 60 and parallel to the support plate 4.

A fourth portion of light, which is illustrated by exemplary light rays 69, enters the lens 81 after being emitted by the visible light sources 61 and propagates right to the second light exit surface 88 and the refractive portion 90. There, the fourth portion of light experiences refraction into various angular regions. The fourth portion of light encompasses the light as output by the plurality of light sources 6 in an angular range of about 60° between 30° laterally inwards of the principal light emission directions 60 and parallel to the support plate 4.

With the given lens 81, a highly efficient fulfilling of the FAR requirements for aircraft beacon lights 2, requiring a high intensity peak in the horizontal plane in the aircraft frame of reference and requiring a decreasing intensity for larger angles with respect to the horizontal plane, can be achieved.

The total internal reflection at the first and second total internal reflection surfaces 82, 86 may allow for providing the peak in the horizontal plane in a particularly space-efficient and energy-efficient manner. As compared to previous approaches, where complex optical systems, based on metallic reflectors, were used, an FAR-compliant beacon light output may be achieved with up to 80% reduction in beacon light volume and up to 60% reduction in height over the fuselage 104. In this way, aerodynamic drag can be reduced, and the exposure to damaging particles and larger structures, such as birds, can be reduced.

It is, however, explicitly pointed out that the shaping of the visible beacon light output may also be achieved with other optical structure designs and that exemplary embodiments of the present invention may also employ such other optical structure designs. In particular, it is possible that only a single visible light source is provided and that a suitable optical structure is provided for shaping the visible beacon light output from the light emitted by the single visible light source.

The optical structure 8 of the aircraft beacon light 2 according to an exemplary embodiment of the invention further comprises a reflector arrangement 83, which is arranged circumferentially surrounding the lens 81, for conditioning the light output of the outer light sources 62a, 62b, i.e. of the infrared light sources 62a, 62b.

Figure 5:
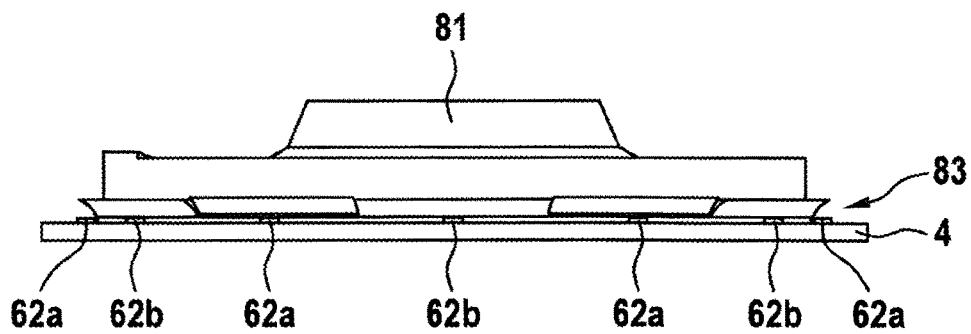
FIG. 5 shows a side view of a multi mode aircraft beacon light according to an exemplary embodiment of the invention.
Figure 6:
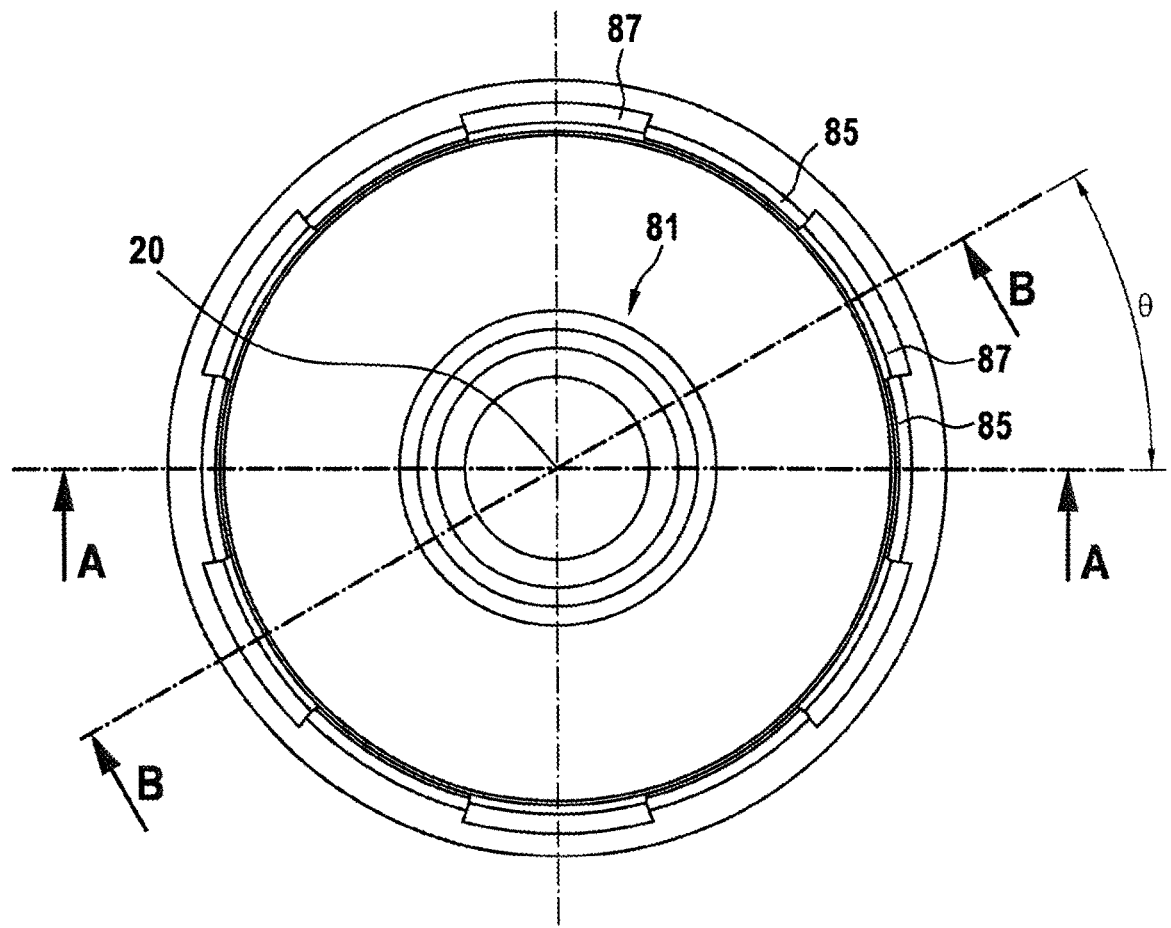
FIG. 6 shows a top view of the multi mode aircraft beacon light shown in FIG. 5.

A side view of the optical structure 8 of an aircraft beacon light 2 according to an exemplary embodiment of the invention is depicted in FIG. 5. In particular, the side view depicts the support plate 4, the lens 81, the reflector arrangement 83 surrounding the lens 81, and some of the infrared light sources 62a, 62b. A top view of the optical structure 8 is depicted in FIG. 6. The components depicted in FIGS. 5 and 6 may be employed in the implementation of the aircraft beacon light, as described above with respect to FIGS. 2 to 4.

The reflector arrangement 83 has a 6-fold rotational symmetry with respect to the central axis of symmetry 20. In particular, the reflector arrangement 83 comprises six first reflectors 85 and six second reflectors 87, which are arranged adjacent to each other in an alternating manner along the circumferential periphery of the reflector arrangement 83. In the embodiment depicted in FIG. 6, each of the first and second reflectors 85, 87 spans an angular range of 30° along the circumferential periphery of the reflector arrangement 83.

The configuration depicted in FIG. 6, comprising twelve reflectors 85, 87, is only exemplary. A reflector arrangement 83 according to an alternative exemplary embodiment of the invention may comprise fewer reflectors, with each reflector spanning a larger angular range along the circumferential periphery of the reflector arrangement 83. The reflector arrangement 83 may also comprise more than twelve reflectors, with each reflector spanning a smaller angular range along the circumferential periphery of the reflector arrangement 83.

The first and second reflectors 85, 87 have different configurations for shaping two different outputs of infrared light from the infrared light, emitted by the infrared light sources 62a, 62b. In particular, a respective first reflector 85 is associated with each infrared light source of the first subset of infrared light sources 62a, and a respective second reflector 87 is associated with each infrared light source of the second subset of infrared light sources 62b. This will be described in more detail below with respect to FIGS. 7 and 8.

Figure 7:
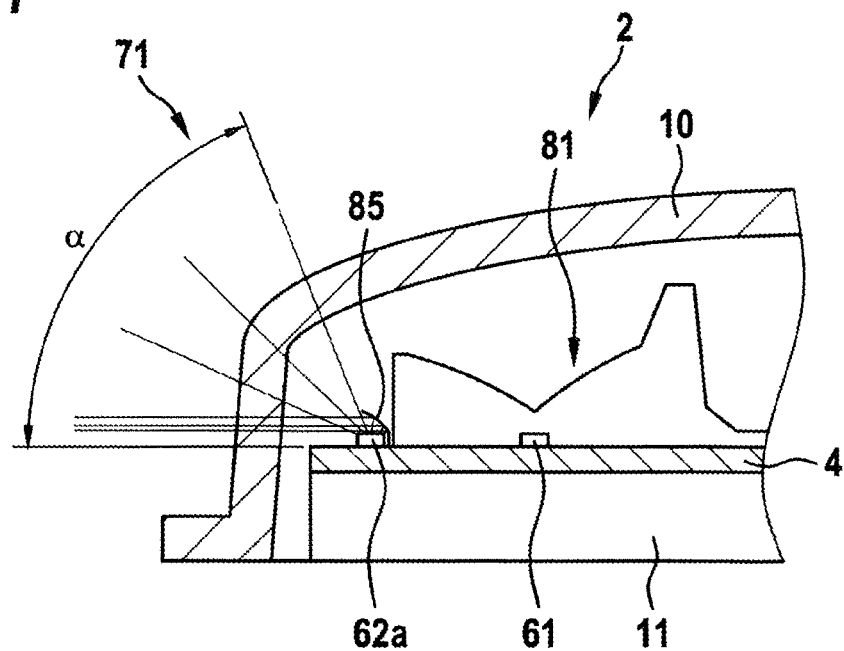
FIG. 7 depicts an enlarged cross-sectional view of the multi mode aircraft beacon light of FIG. 6, taken along the cross-sectional plane A-A indicated in FIG. 6.

FIG. 7 depicts an enlarged cross-sectional view of the aircraft beacon light 2 of FIG. 6, taken along the cross-sectional plane A-A indicated in FIG. 6, which includes a first reflector 85.

Figure 8:
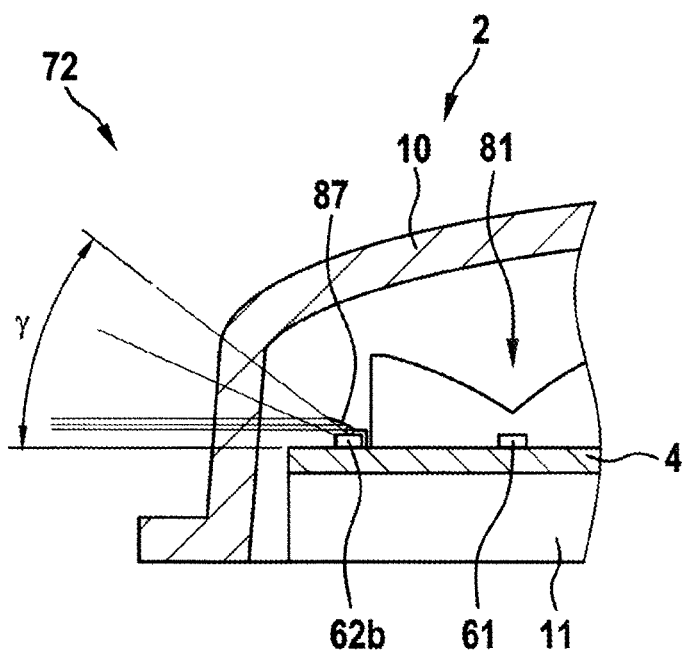
FIG. 8 depicts an enlarged cross-sectional view of the multi mode aircraft beacon light of FIG. 6, taken along the cross-sectional plane B-B indicated in FIG. 6.

FIG. 8 depicts an enlarged cross-sectional view of the aircraft beacon light 2 of FIG. 6, taken along the cross-sectional plane B-B indicated in FIG. 6, which includes a second reflector 87.

The first reflectors 85 are arranged above infrared light sources 62a of the first subset of infrared light sources 62a. The first reflectors 85 are shaped/configured for making the infrared light, which is emitted by the infrared light sources 62a of the first subset of infrared light sources 62a, contribute to/form a first infrared beacon light output 71, having an opening angle α in the vertical plane of at least 70°, in particular an opening angle α in the range of between 70° to 90°, as it is shown in FIGS. 1 and 7.

The second reflectors 87 are arranged above infrared light sources 62b of the second subset of infrared light sources 62b. The second reflectors 87 are shaped/configured for making the infrared light, which is emitted by the infrared light sources 62b of the second subset of infrared light sources 62, contribute to/form a second infrared beacon light output 72, having an opening angle γ in the vertical plane of between 25° to 50°, in particular an opening angle γ of between 30° and 45°, as it is shown in FIGS. 1 and 8.

The first and second reflectors 85, 87 may be parabolic, thus collimating a substantial portion of the light emitted by the plurality of infrared light sources 62a, 62 in or around the horizontal plane, but may differ in terms of their lateral extension, when seen from the axis of symmetry 20. In this way, when compared to the second reflectors 87, the first reflectors 85 may give more room for light rays, having a larger angle with respect to the support plate 4, to exit the aircraft beacon light 2 unaffected by the first reflectors 85. It is also possible that the first and second reflectors 85, 87 have different inclinations with respect to the support plate, resulting in different opening angles of the respective light outputs.

In case an aircraft beacon light 2 according to an exemplary embodiment of the invention is mounted to the top of an aircraft 100 as an upper aircraft beacon light 2, as it is depicted in FIG. 1, infrared light may be emitted into the upper spatial sector U above the aircraft 100, having an opening angle α in the vertical plane of at least 70°, in particular an opening angle α in the range of between 70° to 90°, by activating the infrared light sources 62a of the first subset of infrared light sources 62a.

In case an aircraft beacon light 2 according to an exemplary embodiment of the invention is mounted to the bottom of the aircraft 100 as a lower aircraft beacon light 2, as it is depicted in FIG. 1, infrared light may be emitted only into the second lower spatial sector L2 below the aircraft 100, having an opening angle γ in the vertical plane in the range of between 25° to 50°, in particular an opening angle γ of between 30° and 45°, by deactivating the infrared light sources 62a of the first subset of infrared light sources 62a and activating the infrared light sources 62b of the second subset of infrared light sources 62b.

In other words, the opening angles α, γ of the infrared beacon light outputs 71, 72 of the aircraft beacon light 2 may be switched between a broader infrared beacon light output 71, having a large opening angle α, and a more narrow infrared beacon light output 72, having a smaller opening angle γ, by selectively activating the infrared light sources 62a of the first subset of infrared light sources 62a or the infrared light sources 62b of the second subset of infrared light sources 62b, respectively.

As mentioned, the aircraft beacon light 2 further comprises an orientation sensor 14 (cf. FIGS. 2 and 3), which is coupled to the controller 12. The orientation sensor 14 is configured for providing an orientation sensor signal, which is indicative of the mounting orientation of the aircraft beacon light 2. The orientation sensor signal may in particular be indicative of whether the aircraft beacon light 2 is employed as upper aircraft beacon light, mounted in an upper fuselage mounting position on top of the aircraft 100, or as a lower aircraft beacon light, mounted in a lower fuselage mounting position on the bottom of the aircraft 100.

The orientation sensor signal may be transmitted to the controller 12, and the controller 12 may be configured for selectively operating the outer light sources 62a, 62b, i.e. the infrared light sources 62a, 62b, depending on the mounting orientation of the aircraft beacon light 2, as determined from the orientation sensor signal provided by the orientation sensor 14.

In particular, when the orientation sensor 14 and/or the controller 12 has detected that the aircraft beacon light 2 is mounted to the aircraft 100 as a lower aircraft beacon light in a lower fuselage mounting position, the controller 12 may activate the infrared light sources 62b of the second subset of infrared light sources 62a, 62b, but not the infrared light sources 62a of the first subset of infrared light sources 62a, 62b. As a result, infrared light is emitted only into the second lower spatial sector L2, which has a comparably small opening angle γ in the range of between 25° to 50°.

On the other hand, when the orientation sensor 14 and/or the controller 12 has detected that the aircraft beacon light 2 is mounted to the aircraft 100 as an upper aircraft beacon light in an upper fuselage mounting position, the controller 12 may activate the infrared light sources 62a of the first subset of infrared light sources 62a, 62b, in order to emit infrared light into the first upper spatial sector U, which has a larger opening angle α than the second lower spatial sector L2, i.e. α>γ, in particular an opening angle α in the range of between 70° and 90°.

When the aircraft beacon light 2 is mounted to the aircraft 100 in the upper fuselage mounting position, the infrared light sources 62b of the second subset of infrared light sources 62a, 62b may be activated in addition to the infrared light sources 62a of the first subset of infrared light sources 62a, 62b, in order to increase the total light output of the aircraft beacon light 2. Activating the infrared light sources 62b of the second subset of infrared light sources 62a, 62b may however, be optional, since a sufficient light output already be generated by the infrared light sources 62a of the first subset of infrared light sources 62a, 62b.

The orientation sensor 14 may comprise an inertial sensor, which is configured for providing an orientation sensor signal that is indicative of the orientation of the orientation sensor 14 with respect to gravity.

Alternatively or additionally, the orientation sensor 14 may comprise an optical sensor/photo sensor, which is configured for providing an orientation sensor signal that is indicative of the amount of light, in particular the amount of sun light/ambient light, which hits the orientation sensor 14. As the sun is almost always located above the aircraft 100, the optical sensor/photo sensor will detect a larger amount of light when the aircraft beacon light 2, including the orientation sensor 14, is mounted as an upper aircraft beacon light to a top portion of the fuselage 104, as compared to a configuration, in which the aircraft beacon light 2 is mounted as a lower aircraft beacon light to a bottom portion of the fuselage 104.

The controller 12 may be configured for making a permanent determination about the mounting orientation of the aircraft beacon light 2 from the orientation sensor signal supplied by the orientation sensor 14. When the controller 12 is configured for making a permanent determination, the controller 12 will not change the determination of the aircraft beacon light 2 with respect to the aircraft 100, once said determination has been made. In other words, once the controller has determined, based on the orientation sensor signal supplied by the orientation sensor 14, that the aircraft beacon light 2 is mounted as an upper aircraft beacon light to a top portion of the fuselage 104, this determination will be fixed for the lifetime of the aircraft beacon light 2 and said aircraft beacon light 2 will not be considered a lower aircraft beacon light, which is mounted to a bottom portion of the fuselage 104. Similarly, once the controller has determined, based on the orientation sensor signal supplied by the orientation sensor 14, that the aircraft beacon light 2 is mounted as a lower aircraft beacon light to a bottom portion of the fuselage 104, this determination will be fixed for the lifetime of the aircraft beacon light 2 and said aircraft beacon light 2 will not be considered an upper aircraft beacon light, which is mounted to an upper portion of the fuselage 104. Exceptions may apply in exceptional circumstances, such as a full reset of the aircraft beacon light 2.

Making a permanent determination about the mounting orientation of the aircraft beacon lights 2 may prevent erroneous changes of the determination of the mounting orientation of the aircraft beacon lights 2 due to unusual flight conditions of the aircraft 100, for example flight conditions in which the aircraft 100 is temporarily flying in an upside down orientation.

The determined mounting orientation of the respective aircraft beacon light 2 may be written into a memory of the controller 12 in a non-alterable manner. The determined mounting orientation may further be indicated via a visual indicator, such as an indicator LED, which is visible from outside the aircraft beacon light 2. Such a visual indicator may allow for unambiguously indicating the mounting orientation that has been set for the aircraft beacon light 2, in order to prevent that the aircraft beacon light 2 is re-mounted in a wrong position/orientation to the aircraft 100 after repair and/or maintenance.

In order to prevent a false determination of the mounting orientation of the aircraft beacon light 2, the mounting orientation of the aircraft beacon light 2 may be determined only after stable conditions, in particular stable flight conditions, have been observed for a predetermined amount of time, for example for at least 5, 10 or 15 minutes, after the aircraft beacon light 2 has been activated for the first time.

Preventing a false determination of the mounting orientation of the aircraft beacon light 2 may also include determining and evaluating an average, in particular a weighted average, of a plurality of orientation sensor readings, provided by the orientation sensor 14 over a predetermined period of time.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A multi mode aircraft beacon light, comprising:
a mounting portion for mounting the multi mode aircraft beacon light to an aircraft fuselage;
at least one visible light source for emitting a visible beacon light output;
a plurality of infrared light sources for emitting an infrared beacon light output;
an orientation sensor; and
a controller, coupled to the orientation sensor for receiving an orientation sensor signal from the orientation sensor, wherein the controller is configured to:
determine a mounting orientation of the multi mode aircraft beacon light from the orientation sensor signal, wherein the mounting orientation is indicative of whether the multi mode aircraft beacon light has an upper fuselage mounting position or a lower fuselage mounting position; and
selectively operate the plurality of infrared light sources, depending on the mounting orientation of the multi mode aircraft beacon light.

2. The multi mode aircraft beacon light according to claim 1, wherein the orientation sensor comprises an inertial sensor.

3. The multi mode aircraft beacon light according to claim 1, wherein the orientation sensor comprises a photo sensor.

4. The multi mode aircraft beacon light according to claim 1, wherein the plurality of infrared light sources include:
a first subset of infrared light sources, associated with at least one first optical element, and
a second subset of infrared light sources, associated with at least one second optical element;
wherein the controller is configured to operate the first subset of infrared light sources, in particular only the first subset of infrared light sources, when the mounting orientation indicates the upper fuselage mounting position, with the first subset of infrared light sources and the at least one first optical element in operation providing an upper infrared beacon light output,
or
operate the first and second subsets of infrared light sources, when the mounting orientation indicates the upper fuselage mounting position, with the first and second subsets of infrared light sources and the first and second optical elements in operation providing an upper infra-red beacon light output; and
operate only the second subset of infrared light sources, when the mounting orientation indicates the lower fuselage mounting position, with the second subset of infrared light sources and the at least one second optical element in operation providing a lower infrared beacon light output.

5. The multi mode aircraft beacon light according to claim 4, wherein the upper infrared beacon light output, when projected onto a vertical plane, has a larger opening angle ($\alpha,\gamma$) than the lower infrared beacon light output.

6. The multi mode aircraft beacon light according to claim 4,
wherein the upper infrared beacon light output, when projected onto a vertical plane, has an opening angle ($\alpha$) of between 70° and 90°, in particular an opening angle ($\alpha$) of between 75° and 85°;
and/or wherein the lower infrared beacon light output, when projected onto a vertical plane, has an opening angle (γ) of between 25° and 50°, in particular an opening angle (γ) of between 30° and 45°.

7. The multi mode aircraft beacon light according to claim 4,
wherein each of the first subset of infrared light sources has a respective first optical element associated therewith, wherein said respective first optical element is in particular a respective first reflector;
and/or
wherein each of the second subset of infrared light sources has a respective second optical element associated therewith, wherein said respective second optical element is in particular a respective second reflector.

8. The multi mode aircraft beacon light according to claim 4, wherein the plurality of infrared light sources are arranged in an annular configuration, wherein the infrared light sources of the first subset of infrared light sources and of the second subset of infrared light sources are in particular arranged in an alternating manner.

9. The multi mode aircraft beacon light according to claim 1, wherein the controller is configured to:
operate all of the plurality of infrared light sources, when the mounting orientation indicates the upper fuselage mounting position, and
disable all of the plurality of infrared light sources, when the mounting orientation indicates the lower fuselage mounting position.

10. The multi mode aircraft beacon light according to claim 1, wherein the controller is configured to make a permanent determination about the mounting orientation of the multi mode aircraft beacon light from the orientation sensor signal.

11. The multi mode aircraft beacon light according to claim 1,
wherein the at least one visible light source includes a plurality of visible light sources and wherein the plurality of visible light sources are arranged in an annular configuration, wherein the plurality of infrared light sources are in particular arranged outside of the annular configuration of the plurality of visible light sources;
and/or
wherein the at least one visible light source includes at least one red light source for emitting a red anti-collision light output, wherein the at least one visible light source in particular includes a plurality of red light sources for emitting a red anti-collision light output;
and/or
wherein the at least one visible light source includes at least one white light source for emitting a white anti-collision light output, wherein the at least one visible light source in particular includes a plurality of white light sources for emitting a white anti-collision light output.

12. An aircraft comprising the at least one multi mode aircraft beacon light according to claim 1, mounted to a lower portion of the fuselage of the aircraft.

13. An aircraft comprising the at least one multi mode aircraft beacon light according to claim 1, mounted to an upper portion of the fuselage of the aircraft.

14. An aircraft comprising the at least one upper multi mode aircraft beacon light mounted to an upper portion of the fuselage of the aircraft, and the at least one lower multi mode aircraft beacon light according to claim 1, mounted to a lower portion of the fuselage of the aircraft.

15. A method of installing and operating a multi mode aircraft beacon light, which comprises at least one visible light source for emitting a visible beacon light output and a plurality of infrared light sources for emitting an infrared beacon light output, wherein the method includes:
mounting the multi mode aircraft beacon light to an upper portion of an aircraft fuselage or to a lower portion of the aircraft fuselage;
determining a mounting orientation of the multi mode aircraft beacon light with an orientation sensor within the multi mode aircraft beacon light, after the multi mode aircraft beacon light has been mounted to the aircraft fuselage;
selectively operating the plurality of infrared light sources, depending on the mounting orientation of the multi mode aircraft beacon light.

16. The method according to claim 15, wherein the multi mode aircraft beacon light comprises a first subset of infrared light sources and a second subset of infrared light sources, wherein the method includes:
operating only the first subset of infrared light sources or operating the first and second subsets of infrared light sources, when the mounting orientation indicates an upper fuselage mounting position of the multi mode aircraft beacon light; and
operating only the second subset of infrared light sources, when the mounting orientation indicates a lower fuselage mounting position of the multi mode aircraft beacon light.

17. The method according to claim 15, wherein the method includes: making the determination about the mounting orientation of the multi mode aircraft beacon light after having received an orientation sensor signal from the orientation sensor for at least a predetermined amount of time and/or after having received a predetermined number of orientation sensor readings from the orientation sensor.

* * * * *